(12) United States Patent
Han et al.

(10) Patent No.: US 11,467,855 B2
(45) Date of Patent: Oct. 11, 2022

(54) APPLICATION PRELOADING METHOD AND DEVICE, STORAGE MEDIUM AND TERMINAL

(71) Applicant: GUANGDONG OPPO MOBILE TELECOMMUNICATIONS CORP., LTD., Guangdong (CN)

(72) Inventors: Shiguang Han, Dongguan (CN); Yan Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 723 days.

(21) Appl. No.: 16/414,210

(22) Filed: May 16, 2019

(65) Prior Publication Data

US 2019/0370022 A1 Dec. 5, 2019

(30) Foreign Application Priority Data

Jun. 5, 2018 (CN) .......................... 201810578120.8

(51) Int. Cl.
- *G06F 9/445* (2018.01)
- *G06F 9/451* (2018.01)
- *G06F 9/52* (2006.01)

(52) U.S. Cl.
CPC .......... *G06F 9/44578* (2013.01); *G06F 9/445* (2013.01); *G06F 9/451* (2018.02); *G06F 9/52* (2013.01)

(58) Field of Classification Search
CPC . G06F 9/52; G06F 9/445; G06F 9/451; G06F 9/44578
See application file for complete search history.

(56) References Cited

U.S. PATENT DOCUMENTS

| 7,747,749 | B1 | 6/2010 | Erikson |
| 8,812,658 | B1 | 8/2014 | Teeraparpwong |
| 9,189,252 | B2 | 11/2015 | Chu |

(Continued)

FOREIGN PATENT DOCUMENTS

| CN | 1940858 A | 4/2007 |
| CN | 101615141 A | 12/2009 |

(Continued)

OTHER PUBLICATIONS

Notice of Rejection of the Chinese application No. 201810578120.8, dated Jul. 5, 2021.

(Continued)

*Primary Examiner* — Nimesh G Patel

(57) ABSTRACT

The embodiments of the disclosure provide an Application (APP) preloading method and device, a storage medium and a terminal. The method includes that: when an APP preloading event is detected to be triggered, an APP to be preloaded is determined; whether a first APP which is being started in foreground exists or not is judged; and if NO, the APP to be preloaded is preloaded. According to the application, with adoption of the technical solution, not only low speed and non-fluency, caused by preloading the APP, for starting of the APP in foreground may be effectively avoided, but also a speed of preloading the APP to be preloaded may be effectively increased, so that a speed of starting the APP to be preloaded may be increased.

18 Claims, 5 Drawing Sheets

(56) References Cited

U.S. PATENT DOCUMENTS

| | | |
|---|---|---|
| 9,448,708 B1 | 9/2016 | Bennett |
| 9,508,040 B2 | 11/2016 | Bilal et al. |
| 9,513,888 B1 | 12/2016 | Fultz et al. |
| 9,557,889 B2 | 1/2017 | Raleigh et al. |
| 9,565,233 B1 | 2/2017 | Ozuysal et al. |
| 9,588,897 B2 | 3/2017 | Clausen et al. |
| 10,055,096 B2 | 8/2018 | Falkenburg et al. |
| 10,261,672 B1 | 4/2019 | Dolbakian et al. |
| 10,261,938 B1 | 4/2019 | Jenkins |
| 10,310,872 B2 | 6/2019 | Tsirkin |
| 10,459,887 B1 | 10/2019 | Dvortsov et al. |
| 10,812,564 B1* | 10/2020 | Ozuysal .............. H04L 67/02 |
| 10,901,779 B2 | 1/2021 | Wen et al. |
| 10,936,340 B2 | 3/2021 | Lee et al. |
| 2001/0037488 A1 | 11/2001 | Lee |
| 2003/0172269 A1 | 9/2003 | Newcombe |
| 2003/0177179 A1 | 9/2003 | Jones |
| 2003/0220984 A1 | 11/2003 | Jones |
| 2004/0030882 A1* | 2/2004 | Forman .............. G06F 9/445 713/100 |
| 2004/0153445 A1 | 8/2004 | Horvitz |
| 2005/0160352 A1 | 7/2005 | Chung |
| 2005/0204198 A1 | 9/2005 | Pagan |
| 2006/0129606 A1 | 6/2006 | Horvitz |
| 2006/0190440 A1 | 8/2006 | Horvitz |
| 2007/0016480 A1 | 1/2007 | Lee |
| 2008/0005736 A1 | 1/2008 | Apacible |
| 2008/0295018 A1 | 11/2008 | Nurmi |
| 2009/0144396 A1 | 6/2009 | Walton |
| 2010/0082321 A1 | 4/2010 | Cherkasova |
| 2011/0090234 A1 | 4/2011 | Bolcsfoldi |
| 2011/0145362 A1 | 6/2011 | Jones |
| 2011/0291964 A1 | 12/2011 | Chambers |
| 2011/0291969 A1 | 12/2011 | Rashid |
| 2011/0292060 A1 | 12/2011 | Chambers |
| 2011/0295830 A1 | 12/2011 | Swahn |
| 2011/0296344 A1 | 12/2011 | Habib |
| 2012/0023226 A1 | 1/2012 | Petersen |
| 2012/0105363 A1 | 5/2012 | Sirpal |
| 2012/0117495 A1 | 5/2012 | Sirpal |
| 2012/0167122 A1 | 6/2012 | Koskimies |
| 2012/0200540 A1 | 8/2012 | Chambers |
| 2012/0324481 A1 | 12/2012 | Xia |
| 2013/0067394 A1 | 3/2013 | Nan |
| 2013/0076597 A1 | 3/2013 | Becze |
| 2013/0120294 A1 | 5/2013 | Sun et al. |
| 2013/0124673 A1 | 5/2013 | Hjelm |
| 2013/0173513 A1 | 7/2013 | Chu |
| 2014/0075377 A1 | 3/2014 | Kang et al. |
| 2014/0101611 A1 | 4/2014 | Lang |
| 2014/0173354 A1 | 6/2014 | Stanquist et al. |
| 2014/0184471 A1 | 7/2014 | Martynov |
| 2014/0331174 A1 | 11/2014 | Wen et al. |
| 2014/0372356 A1 | 12/2014 | Bilal et al. |
| 2014/0373032 A1 | 12/2014 | Merry et al. |
| 2015/0026415 A1 | 1/2015 | Clausen et al. |
| 2015/0293701 A1 | 10/2015 | Kim et al. |
| 2015/0324137 A1 | 11/2015 | Wu et al. |
| 2015/0355795 A1 | 12/2015 | Falkenburg et al. |
| 2015/0378535 A1 | 12/2015 | Habib et al. |
| 2016/0056953 A1 | 2/2016 | Komano et al. |
| 2016/0070421 A1 | 3/2016 | Zhang et al. |
| 2016/0117716 A1 | 4/2016 | Lin |
| 2016/0132344 A1 | 5/2016 | Funk et al. |
| 2016/0162148 A1 | 6/2016 | Murphy et al. |
| 2016/0189049 A1 | 6/2016 | Silvestri et al. |
| 2016/0203021 A1 | 7/2016 | Pike et al. |
| 2016/0246484 A1 | 8/2016 | Kim et al. |
| 2016/0321090 A1 | 11/2016 | Konstantinov |
| 2016/0357572 A1 | 12/2016 | Myrick et al. |
| 2016/0360336 A1 | 12/2016 | Gross et al. |
| 2016/0364272 A1 | 12/2016 | Hou et al. |
| 2017/0003866 A1 | 1/2017 | Bennett et al. |
| 2017/0031690 A1 | 2/2017 | Ren |
| 2017/0046171 A1 | 2/2017 | Jung et al. |
| 2017/0185250 A1 | 6/2017 | Cho et al. |
| 2017/0195451 A1 | 7/2017 | Backholm |
| 2017/0330248 A1 | 11/2017 | Gomariz et al. |
| 2017/0344783 A1 | 11/2017 | Zhang et al. |
| 2018/0077243 A1 | 3/2018 | Mathew et al. |
| 2018/0089105 A1 | 3/2018 | Bain et al. |
| 2018/0097905 A1 | 4/2018 | Todasco et al. |
| 2018/0113773 A1 | 4/2018 | Krishnan et al. |
| 2018/0217853 A1 | 8/2018 | Li et al. |
| 2018/0246635 A1 | 8/2018 | Baer et al. |
| 2018/0293087 A1 | 10/2018 | Lee et al. |
| 2019/0018565 A1 | 1/2019 | Lee et al. |
| 2019/0065240 A1 | 2/2019 | Kong et al. |
| 2019/0138904 A1 | 5/2019 | Millius et al. |
| 2019/0138919 A1 | 5/2019 | Chen |
| 2019/0146625 A1 | 5/2019 | Zhu |
| 2019/0258372 A1 | 8/2019 | Wang |
| 2019/0303176 A1 | 10/2019 | John |
| 2019/0342298 A1 | 11/2019 | Chen et al. |
| 2019/0361581 A1 | 11/2019 | Wang et al. |
| 2019/0372345 A1 | 12/2019 | Bain et al. |
| 2020/0342338 A1 | 10/2020 | Huang |
| 2020/0401418 A1 | 12/2020 | Regev et al. |
| 2021/0042622 A1 | 2/2021 | Sun |
| 2021/0329091 A1* | 10/2021 | Yellin ................ G06F 9/44505 |

FOREIGN PATENT DOCUMENTS

| | | |
|---|---|---|
| CN | 102446096 A | 5/2012 |
| CN | 102541602 A | 7/2012 |
| CN | 102819436 A | 12/2012 |
| CN | 102929532 A | 2/2013 |
| CN | 103092687 A | 5/2013 |
| CN | 103106000 A | 5/2013 |
| CN | 103246529 A | 8/2013 |
| CN | 103376974 A | 10/2013 |
| CN | 103412757 A | 11/2013 |
| CN | 103581754 A | 2/2014 |
| CN | 103593479 A | 2/2014 |
| CN | 103631612 A | 3/2014 |
| CN | 103677922 A | 3/2014 |
| CN | 103995716 A | 8/2014 |
| CN | 104092821 A | 10/2014 |
| CN | 104298554 A | 1/2015 |
| CN | 104657183 A | 5/2015 |
| CN | 104809174 A | 7/2015 |
| CN | 104850799 A | 8/2015 |
| CN | 104951340 A | 9/2015 |
| CN | 105426214 A | 3/2016 |
| CN | 105431822 A | 3/2016 |
| CN | 105657522 A | 6/2016 |
| CN | 105682037 A | 6/2016 |
| CN | 105786839 A | 7/2016 |
| CN | 105824657 A | 8/2016 |
| CN | 105912215 A | 8/2016 |
| CN | 105912227 A | 8/2016 |
| CN | 105939416 A | 9/2016 |
| CN | 105955765 A | 9/2016 |
| CN | 106055369 A | 10/2016 |
| CN | 106056010 A | 10/2016 |
| CN | 106066805 A | 11/2016 |
| CN | 106201241 A | 12/2016 |
| CN | 106201448 A | 12/2016 |
| CN | 106250988 A | 12/2016 |
| CN | 106325913 A | 1/2017 |
| CN | 106406966 A | 2/2017 |
| CN | 106569894 A | 4/2017 |
| CN | 106648733 A | 5/2017 |
| CN | 106648747 A | 5/2017 |
| CN | 106685851 A | 5/2017 |
| CN | 106775820 A | 5/2017 |
| CN | 106778248 A | 5/2017 |
| CN | 106874091 A | 6/2017 |
| CN | 106874095 A | 6/2017 |
| CN | 106919313 A | 7/2017 |
| CN | 106941672 A | 7/2017 |
| CN | 106959879 A | 7/2017 |
| CN | 107016038 A | 8/2017 |
| CN | 107092412 A | 8/2017 |

(56) References Cited

FOREIGN PATENT DOCUMENTS

| | | |
|---|---|---|
| CN | 107229397 A | 10/2017 |
| CN | 107249074 A | 10/2017 |
| CN | 107273011 A | 10/2017 |
| CN | 107368361 A | 11/2017 |
| CN | 107508961 A | 12/2017 |
| CN | 107562495 A | 1/2018 |
| CN | 107678799 A | 2/2018 |
| CN | 107678803 A | 2/2018 |
| CN | 107678823 A | 2/2018 |
| CN | 107728874 A | 2/2018 |
| CN | 107748685 A | 3/2018 |
| CN | 107748686 A | 3/2018 |
| CN | 107766201 A | 3/2018 |
| CN | 107783801 A | 3/2018 |
| CN | 107833073 A | 3/2018 |
| CN | 107872523 A | 4/2018 |
| CN | 107885591 A | 4/2018 |
| CN | 107943650 A | 4/2018 |
| CN | 107944259 A | 4/2018 |
| CN | 108076224 A | 5/2018 |
| CN | 108572965 A | 9/2018 |
| CN | 108595224 A | 9/2018 |
| CN | 108595227 A | 9/2018 |
| CN | 108595228 A | 9/2018 |
| CN | 108595231 A | 9/2018 |
| CN | 108614722 A | 10/2018 |
| CN | 108647052 A | 10/2018 |
| CN | 108647056 A | 10/2018 |
| CN | 108710513 A | 10/2018 |
| CN | 108762831 A | 11/2018 |
| CN | 108762843 A | 11/2018 |
| CN | 108804157 A | 11/2018 |
| CN | 108829456 A | 11/2018 |
| CN | 108829457 A | 11/2018 |
| CN | 108920156 A | 11/2018 |
| CN | 108614722 B | 9/2020 |
| EP | 1242880 A2 | 9/2002 |
| EP | 3358461 A1 | 8/2018 |
| EP | 3480692 A1 | 5/2019 |
| EP | 3486769 A1 | 5/2019 |
| EP | 3567478 B1 | 8/2021 |
| WO | 03054696 A1 | 7/2003 |
| WO | 2013073908 A1 | 5/2013 |
| WO | 2015169188 A1 | 11/2015 |
| WO | 2017057912 A1 | 4/2017 |
| WO | 2018055506 A1 | 3/2018 |
| WO | 2018161812 A1 | 9/2018 |
| WO | 2019086043 A1 | 5/2019 |
| WO | 2019171237 A1 | 9/2019 |

OTHER PUBLICATIONS

Fifth Office Action of the Chinese application No. 201711340000.6, dated Sep. 14, 2021.
Zhao Zhongtang; "Research on behavior recognition method based on intelligent mobile terminal", University of electronic science and technology press, p. 16, Apr. 30, 2015.
Notice of Rejection of the Chinese application No. 201810530136. 1, dated Jun. 29, 2021.
First Office Action of the European application No. 19169146.8, dated Jul. 29, 2021.
Corrected Notice of Allowance of the U.S. Appl. No. 16/394,768, dated Jul. 12, 2021.
Corrected Notice of Allowance of the U.S. Appl. No. 16/394,768, dated Jul. 30, 2021.
First Office Action of the European application No. 19173778.2, dated Jul. 1, 2021.
Corrected Notice of Allowance of the U.S. Appl. No. 16/397,521, dated Jul. 2, 2021.
Office Action of the Indian application No. 202017029202, dated Sep. 2, 2021.
Final Office Action of the U.S. Appl. No. 16/290,190, dated Jul. 12, 2021.

Notice of oral proceedings in the European application No. 19176708. 6, dated Nov. 26, 2021.
Non-Final Office Action of the U.S. Appl. No. 16/220,601, dated Oct. 5, 2021.
Notice of Rejection of the Chinese application No. 201810531573. 5, dated Oct. 8, 2021.
Android Tutorial, "Smoother loading of items", Jul. 22, 2016, pp. 1-4, [online] (retrieved Dec. 14, 2021, Retrieved from <https://riptutorial.com/android/example/3155/smoother-loading-of-items>.
Non-Final Office Action of the U.S. Appl. No. 16/390,383, dated Dec. 17, 2021.
Second Office Action of the European application No. 18212560.9, dated Dec. 8, 2021.
Second Office Action of the Chinese application No. 201810578120. 8, dated May 7, 2021.
International Search Report in the international application No. PCT/CN2019/083230, dated Jun. 17, 2019.
Written Opinion of the International Search Authority in the international application No. PCT/CN2019/083230, dated Jun. 17, 2019.
First Office Action of the Chinese application No. 201810443194.0, dated Dec. 11, 2019.
Second Office Action of the Chinese application No. 201810443194. 0, dated Mar. 25, 2020.
Notice of Rejection of the Chinese application No. 201810443194. 0, dated Jul. 9, 2020.
Cao Hong et al: "Mining smartphone data for app usage prediction and recommendations: A survey", Pervasive and Mobile Computing, Elsevier, NL, vol. 37, Jan. 20, 2017 (Jan. 20, 2017), pp. 1-22, XP029961029, ISSN: 1574-1192, DOI: 10.1016/J. PMCJ.2017.01. 007 * the whole document *.
Tingxin Yan et al: "Fast app launching for mobile devices using predictive user context", MOBISYS 2012: 10th International Conference on Mobile Systems, Applications and Services, Jun. 25, 2012 (Jun. 25, 2012), p. 113, XP055106616, DOI: 10.1145/2307636. 2307648 ISBN: 978-1-45-031301-8 *the whole document*.
Ricardo Baeza-Yates et al: "Predicting The Next App That You Are Going To Use", Web Search and Data Mining, ACM, 2 Penn Plaza, Suite 701 New York NY 10121-0701 USA, Feb. 2, 2015 (Feb. 2, 2015), pp. 285-294, XP058065486, DOI: 10.1145/2684822. 2685302 ISBN: 978-1-4503-3317-7 *the whole document *.
European Search Report in the European application No. 19171005. 2, dated Oct. 10, 2019.
First Office Action of the European application No. 19171005.2, dated Aug. 28, 2020.
Second Office Action of the European application No. 19171005.2, dated Mar. 24, 2021.
Office Action of the Indian application No. 201914016637, dated Feb. 8, 2021.
International Search Report in the international application No. PCT/CN2019/084999, dated Jul. 25, 2019.
Written Opinion of the International Search Authority in the international application No. PCT/CN2019/084999, dated Jul. 25, 2019.
First Office Action of the Chinese application No. 201810463427.3, dated Feb. 3, 2020.
Abhinav Parate et al: "Practical prediction and prefetch for faster access to applications on mobile phones", Proceedings of the 2013 ACM International Joint Conference on Pervasive and Ubiquitous Computing, UBICOMP '13, Sep. 8, 2013 (Sep. 8, 2013), p. 275, XP055336968, New York, New York, USA DOI: 10.1145/2493432. 2493490 ISBN: 978-1-4503-1770-2 * the whole document *.
European Search Report in the European application No. 19173437. 5, dated Oct. 14, 2019.
First Office Action of the European application No. 19173437.5, dated Nov. 2, 2020.
International Search Report in the international application No. PCT/CN2019/084218, dated Jul. 31, 2019.
Written Opinion of the International Search Authority in the international application No. PCT/CN2019/084218, dated Jul. 31, 2019.
First Office Action of the Chinese application No. 201810400917.9, dated Aug. 28, 2019.
Second Office Action of the Chinese application No. 201810400917. 9, dated Nov. 7, 2019.

(56) References Cited

OTHER PUBLICATIONS

Third Office Action of the Chinese application No. 201810400917.9, dated Jan. 17, 2020.
Notice of Rejection of the Chinese application No. 201810400917.9, dated Apr. 20, 2020.
Luo Hong-Jun, Feng Rui; "Research on Mobile Application Development and Middle Controller Based on Web Technology", Computer Systems & Application, Nov. 30, 2017; p. 19-27.
Notice of Allowance of the Chinese application No. 201810400917.9, dated Sep. 3, 2020.
Supplementary European Search Report in the European application No. 19793314.6, dated Apr. 20, 2021.
International Search Report in the international application No. PCT/CN2018/121309, dated Mar. 14, 2019.
Written Opinion of the International Search Authority in the international application No. PCT/CN2018/121309, dated Mar. 14, 2019.
First Office Action of the Chinese application No. 201711340000.6, dated Nov. 29, 2019.
Second Office Action of the Chinese application No. 201711340000.6, dated Mar. 25, 2020.
Third Office Action of the Chinese application No. 201711340000.6, dated Jul. 7, 2020.
Notice of Rejection of the Chinese application No. 201711340000.6, dated Nov. 4, 2020.
European Search Report in the European application No. 18212560.9, dated May 23, 2019.
First Office Action of the European application No. 18212560.9, dated Apr. 15, 2021.
Office Action of the Indian application No. 201814047359, dated Mar. 22, 2021.
Non-Final Office Action of the U.S. Appl. No. 16/220,601, dated Jul. 8, 2020.
Final Office Action of the U.S. Appl. No. 16/220,601, dated Jan. 19, 2021.
Advisory Action of the U.S. Appl. No. 16/220,601, dated Mar. 26, 2021.
International Search Report in the international application No. PCT/CN2019/082303, dated Jul. 12, 2019.
Written Opinion of the International Search Authority in the international application No. PCT/CN2019/082303, dated Jul. 12, 2019.
Yang, Yujia; "Research on Mobile App Usage Prediction Based on User Behavior Pattern", "Chinese Outstanding Master's Thesis Full-text Database Information Technology Series", Jul. 25, 2016, p. 25, section 3.2.3.2.
First Office Action of the Chinese application No. 201810530136.1, dated Mar. 20, 2020.
Second Office Action of the Chinese application No. 201810530136.1, dated Sep. 30, 2020.
Third Office Action of the Chinese application No. 201810530136.1, dated Apr. 2, 2021.
European Search Report in the European application No. 19169146.8, dated Nov. 12, 2019.
Office Action of the Indian application No. 201914014288, dated Mar. 22, 2021.
International Search Report in the international application No. PCT/CN2019/076755, dated May 10, 2019.
Written Opinion of the International Search Authority in the international application No. PCT/CN2019/076755, dated May 10, 2019.
First Office Action of the Indian application No. 201914018342, dated May 12, 2021.
First Office Action of the Indian application No. 201914017025, dated Jan. 27, 2021.
Fourth Office Action of the Chinese application No. 201711340000.6, dated Jun. 3, 2021.
Second Office Action of the Chinese application No. 201810531573.5, dated Jun. 24, 2021.
International Search Report in the international application No. PCT/CN2019/089685, dated Aug. 28, 2019.
Written Opinion of the International Search Authority in the international application No. PCT/CN2019/089685, dated Aug. 28, 2019.
European Search Report in the European application No. 19176708.6, dated Nov. 5, 2019.
Office Action of the Indian application No. 201914022209, dated Sep. 30, 2020.
First Office Action of the Chinese application No. 201810578120.8, dated Nov. 30, 2020.
First Office Action of the European application No. 19176708.6, dated Jun. 23, 2020.
First Office Action of the Chinese application No. 201810532749.9, dated Mar. 2, 2020.
European Search Report in the European application No. 19162115.0, dated Sep. 27, 2019.
International Search Report in the international application No. PCT/CN2019/083479, dated Jun. 27, 2019.
Written Opinion of the International Search Authority in the international application No. PCT/CN2019/083479, dated Jun. 27, 2019.
First Office Action of the Chinese application No. 201810531573.5, dated Oct. 29, 2020.
Partial European Search Report in the European application No. 19173778.2, dated Oct. 11, 2019.
Google: "Multi-Window Support—Android Developers", May 19, 2018 (May 19, 2018), XP055659703, Retrieved from the Internet: URL: https://web.archive.org/web/20180519111727/https://developer.android.com/guide/topics/ui/multi-window [retrieved on Jan. 20, 2020] * the whole document *.
European Search Report in the European application No. 19173778.2, dated Jan. 29, 2020.
Office Action of the Indian application No. 201914018510, dated Jan. 27, 2021.
Non-Final Office Action of the U.S. Appl. No. 16/394,768, dated Feb. 19, 2021.
Notice of Allowance of the U.S. Appl. No. 16/394,768, dated Apr. 28, 2021.
International Search Report in the international application No. PCT/CN2019/085347, dated Jul. 29, 2019.
Written Opinion of the International Search Authority in the international application No. PCT/CN2019/085347, dated Jul. 29, 2019.
First Office Action of the Chinese application No. 201810443981.5, dated Feb. 10, 2020.
Second Office Action of the Chinese application No. 201810443981.5, dated Aug. 3, 2020.
Ianxin0802; Using Neural Network to Predict Time Series, <CSDN>, * the whole document *.
Third Office Action of the Chinese application No. 201810443981.5, dated Nov. 16, 2020.
European Search Report in the European application No. 19173310.4, dated Oct. 11, 2019.
Office Action of the Indian application No. 201914018092, dated Feb. 8, 2021.
International Search Report in the international application No. PCT/CN2019/085900, dated Aug. 1, 2019.
Written Opinion of the International Search Authority in the international application No. PCT/CN2019/085900, dated Aug. 1, 2019.
First Office Action of the Chinese application No. 201810532722.X, dated Sep. 23, 2019.
Notice of Allowance of the Chinese application No. 201810532722.X, dated Mar. 25, 2020.
European Search Report in the European application No. 19168847.2, dated Oct. 23, 2019.
Office Action of the Indian application No. 201914019649, dated Nov. 27, 2020.
Non-Final Office Action of the U.S. Appl. No. 16/290,190, dated Mar. 5, 2020.
Android Developer Guide—Handle activity State Changes (Dated May 8, 2018 and retrieved from www. archive. org on May 27, 2020).
Android Developer Guide—Understand the Activity Lifecycle (Dated May 8, 2018 and retrieved from www. archive. org on May 27, 2020).

(56) References Cited

OTHER PUBLICATIONS

Third-Party Submission filed on Jun. 5, 2020 regarding the U.S. Appl. No. 16/290,190.
International Search Report in the international application No. PCT/CN2019/083256, dated Jun. 14, 2019.
Written Opinion of the International Search Authority in the international application No. PCT/CN2019/083256, dated Jun. 14, 2019.
First Office Action of the Chinese application No. 201810442588.4, dated Mar. 29, 2019.
Second Office Action of the Chinese application No. 201810442588.4, dated Oct. 15, 2019.
Third Office Action of the Chinese application No. 201810442588.4, dated May 18, 2020.
European Search Report in the European application No. 19171253.8, dated Sep. 30, 2019.
First Office Action of the European application No. 19171253.8, dated Sep. 16, 2020.
Non-Final Office Action of the U.S. Appl. No. 16/397,521, dated Feb. 16, 2021.
Notice of Allowance of the U.S. Appl. No. 16/397,521, dated Apr. 15, 2021.
Third-Party Submission filed on May 11, 2020 regarding the U.S. Appl. No. 16/397,521.
Non-Final Office Action of the U.S. Appl. No. 16/407,602, dated Jan. 20, 2022.
Non-Final Office Action of the U.S. Appl. No. 16/398,837, dated Feb. 17, 2022.
Third Office Action of the European application No. 19171005.2, dated Feb. 9, 2022.
Final Office Action of the U.S. Appl. No. 16/220,601, dated Apr. 12, 2022.
Anonymous: "Understand Tasks and Back Stack Android Developers", May 16, 2018 (May 16, 2018), XP055906463, Retrieved from the Internet:URL:https://web.archive.org/web/20180516172227/https://developer.android.com/guide/components/activities/tasks-and-back-stack.
Second Office Action of the European application No. 19173778.2, dated Apr. 8, 2022.
Notice of Allowance of the U.S. Appl. No. 16/390,383, dated Apr. 4, 2022.
Result of consultation of the European application No. 19176708.6, dated May 24, 2022.
Notice of Rejection of the European application No. 19176708.6, dated Aug. 9, 2022.

\* cited by examiner

APPLICATION PRELOADING METHOD AND DEVICE, STORAGE MEDIUM AND TERMINAL

CROSS REFERENCE TO RELATED ART

This application claims priority of Chinese Application No. 201810578120.8, filed on Jun. 5, 2018 and named after "Application Preloading Method and Device, Storage Medium and Terminal", the contents of which are hereby incorporated by reference in its entirety.

BACKGROUND

Terminals such as smart phones, tablet computers, notebook computers and intelligent home appliances have become indispensable electronic equipment in people's daily lives. Along with terminal devices becoming intelligent, operating systems are loaded in most of terminal devices, so that a variety of APPs can be installed in the terminal devices to meet different requirements of users.

Along with the improvement of configurations of terminal devices, dozens or even hundreds of APPs can be installed in most of terminal devices. Along with increasing enriching of functions of APPs, more and more resources are required to be loaded during running of an APP. When a user selects to start an APP, a terminal of the user may load a resource required by starting of the APP. After the loading is completed, the initial interface of the APP is accessed. The whole process usually requires several seconds to tens of seconds, and thus has low efficiency of APP starting, which is urgent to be improved.

SUMMARY

Embodiments of the disclosure relate to the technical field of Application (APP) preloading, and particularly to an APP preloading method and device, a storage medium and a terminal.

The embodiments of the disclosure provide an APP preloading method and device, a storage medium and a terminal, which may optimize a preloading solution for an APP in a terminal.

According to a first aspect, the embodiments of the disclosure provide an APP preloading method, which may include the following operations;

in response to detecting that an APP preloading event is triggered, an APP to be preloaded is determined;

whether a first APP which is being started in foreground exists or not is judged;

in response to that the first APP which is being started in foreground does not exist, the APP to be preloaded is preloaded.

According to a second aspect, the embodiments of the disclosure provide an APP preloading device, which may include a memory for storing a computer program; and a processor, wherein the processor is configured to execute the computer program to implement steps of:

determining an APP to be preloaded in response to detecting that an APP preloading event is triggered;

judging whether a first APP which is being started in foreground exists or not; and preloading the APP to be preloaded in a case that the first APP which is being started in foreground does not exist.

According to a third aspect, the embodiments of the disclosure provide a computer-readable storage medium, in which a computer program may be stored, the program being executable by a processor to implement the APP preloading method of the first aspect of the embodiments of the disclosure.

According to a fourth aspect, the embodiments of the disclosure provide a terminal, which may include the APP preloading device of the second aspect of the embodiments of the disclosure.

It is to be understood that the above general descriptions and detailed descriptions below are only exemplary and explanatory and are not restrictive of the present disclosure.

DETAILED DESCRIPTION

Figure 1:
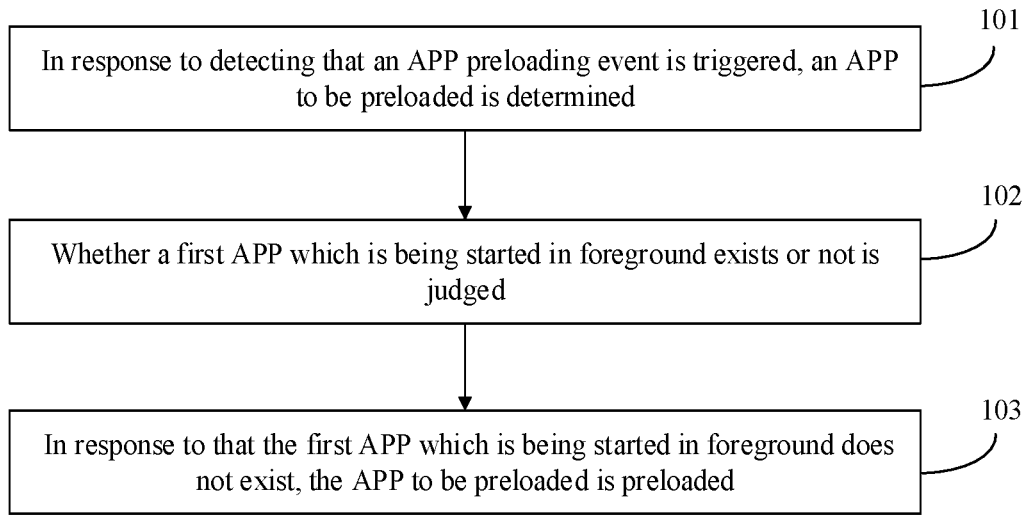
FIG. 1 is a flowchart of an APP preloading method according to an embodiment of the disclosure.

The technical solutions of the disclosure will further be described below in combination with the drawings through specific implementation modes. It is to be understood that the specific embodiments described here are not to limit the disclosure but to explain the disclosure. In addition, it is also to be noted that, for convenient description, not all but only part of structures related to the disclosure are illustrated in the drawings.

It is to be noted, before detailed discussions about exemplary embodiments, that some exemplary embodiments are described as processing or methods described as flowcharts. Although each step in the flowcharts is described into sequential processing, many steps therein may be implemented in parallel, concurrently or simultaneously. In addition, each step may be rearranged. The processing may be terminated when operations thereof are completed, but there may also be additional steps not included in the drawings. The processing may correspond to a method, a function, a procedure, a subroutine, a subprogram and the like.

FIG. 1 is a flowchart of an APP preloading method according to an embodiment of the disclosure. The method may be executed by an APP preloading device. Here, the device may be implemented by software and/or hardware and may usually be integrated in a terminal. As shown in FIG. 1, the method includes the following steps.

In step 101, in response to detecting that an APP preloading event is triggered, an APP to be preloaded is determined.

Exemplarily, a terminal in the embodiment of the disclosure may include a terminal device such as a mobile phone, a tablet computer, a notebook computer and an intelligent home appliance. An operating system is loaded in the terminal.

Exemplarily, a triggering condition for the APP preloading event may be set according to a practical condition and will not be specifically limited in the embodiment of the disclosure. For example, the APP preloading event may be triggered when an operation of a user meets a preset condition (for example, picking up a terminal, inputting a screen unlocking operation or inputting a terminal unlocking operation); or the APP preloading event may be triggered when a foreground APP changes; or the APP preloading event may be triggered immediately (or a preset duration later) after a prediction flow of a preloaded APP is ended; or the APP preloading event may be triggered at a timing interval. After the APP preloading event is triggered, a system may detect that the APP preloading event has been triggered in a manner of reading a flag bit, receiving a triggering instruction or the like, and the specific detection manner is not limited in the embodiments of the disclosure.

Exemplarily, the APP to be preloaded may be understood as an APP that a user may be about to open, or may be a preset fixed APP, or may also be an APP predicted in a certain manner and the like. There may be one or more APPs to be preloaded.

Optionally, a prediction model may be adopted to predict an APP to be preloaded. The prediction model may be a machine learning model. An adopted algorithm may include a Recurrent Neural Network (RNN), a Long Short-Term Memory (LSTM) network, a threshold cycle unit, a simple cycle unit, an auto-encoder, a decision tree, a random forest, characteristic mean classification, a classification and regression tree, hidden Markov, a K-Nearest Neighbor (KNN) algorithm, a logistic regression model, a Bayesian model, a Gaussian model, Kullback-Leibler (KL) divergence and the like.

Optionally, when a user uses a terminal, a training sample may be acquired and the training sample may be adopted to train a preset initial model to finally obtain the prediction model configured to predict an APP to be preloaded. Exemplarily, an element in the training sample may include a time sequence or order sequence for opening an APP, may include time, place, frequency and the like for opening an APP, may include a running state of a terminal, for example, an on/off state of a mobile data network, a connected state of a wireless hot spot, identity information of a connected wireless hot spot, a running APP, a previous foreground APP, a duration for which the present APP stays in background, time when the present APP is switched to background last time, a plugging/unplugging state of a headset jack, a charging state, battery power information and a display duration of a screen, and may further include data acquired by a sensor integrated in the terminal, for example, a motion sensor, a light sensor, a temperature sensor and a humidity sensor.

Exemplarily, a proper sample element may be selected according to the adopted machine learning model, the adopted machine learning model may also be determined according to the selected sample element, and selection of the model and the sample element and the like may also be implemented in combination with requirements on the prediction accuracy, prediction speed and the like. There are no limits made in the embodiments of the disclosure.

In the embodiments of the disclosure, the operation that an APP to be preloaded is determined may include that an APP to be preloaded is determined according to a previous output result of the prediction model, or may also include that prediction is performed by use of the prediction model and a present output result of the prediction model is determined as the APP to be preloaded.

In the embodiments of the disclosure, when there are multiple (N) APPs to be preloaded, the prediction model may output a starting probability of each candidate APP set in candidate APP sets and determine a candidate APP with a relatively high starting probability as the APP to be preloaded. Optionally, the operation that the APP to be preloaded is determined may include that: probabilities of starting candidate APPs are predicted; and a preset number of candidate APPs with high starting probabilities are determined as APPs to be preloaded. Exemplarily, the candidate APPs may refer to all APPs installed in the terminal, or may also refer to part of the APPs. Part of the APPs may not include a system APP or an APP that the user uses less. A determination method and the number of candidate APPs are not limited in the embodiments of the disclosure. Optionally, the candidate APPs may be determined according to a using frequency and/or using duration of each APP in a preset time period before a present moment, the preset time period being, for example, a month, and when the using frequency and/or the using duration exceed/exceeds a threshold value, the corresponding APP is determined as a candidate APP, or, each APP is sequenced according to the using frequencies and/or the using durations and the APPs sequenced at the top are determined as candidate APPs.

Exemplarily, the abovementioned prediction model may be adopted to determine the starting probability of each candidate APP. For example, a present sample is collected according to the training sample for training the prediction model, and the present sample is input into the prediction model to obtain the starting probability of each candidate APP. The starting probabilities may be sequenced from high to low, and the first N candidate APPs (N is a preset value) are determined as APPs to be preloaded. Such a setting has the advantage that multiple APPs may be preloaded and the multiple APPs are determined according to starting probabilities, so that the prediction accuracy may be improved.

In step 102, whether a first APP which is being started in foreground exists or not is judged.

In the embodiments of the disclosure, a Central Processing Unit (CPU), a Graphics Processing Unit (GPU), an Input/Output (I/O) interface and other resources are required to be used during a process of starting an APP in foreground, and similarly, the CPU, the GPU, the I/O interface and the like are also required to be used during a process of preloading the APP. Therefore, if foreground starting of the APP and preloading the APP are simultaneously executed, there may exist system resource contention, which may not only bring influence to a preloading speed of the APP but also bring influence to a starting speed of the APP which is being started in foreground to cause slowing-down and non-fluency for starting of the APP in foreground and further bring a poor user experience. Based on such a consideration, after the APP to be preloaded is determined and before the preloading operation is executed on the APP to be preloaded, it is required to judge whether the first APP which is being started in foreground exists or not.

Optionally, a starting stage of the APP is determined to be from an initial starting moment of the APP to a complete display moment of a display interface of the APP. The operation of judging whether the first APP which is being started in foreground exists or not may include judging whether the first APP in the starting stage exists in foreground or not. Here, the initial starting moment of the APP may be understood as a moment when an instruction for starting the APP is received, for example, a moment when the user presses a desktop icon corresponding to the APP, or a moment when a calling instruction of another APP for calling the APP is detected. The display interface of the APP may include a first displayed operable display interface of the APP rather than an advertisement interface drawn when the APP is started. The complete display moment of the display interface of the APP may be understood as an earliest moment when the display interface of the APP may be clicked or operated by the user after being displayed. Therefore, when whether the first APP which is being started in foreground exists or not is judged, whether the first APP in the starting stage exists in foreground or not may be judged. Exemplarily, when the first APP in the starting stage exists in foreground, it may be determined that the first APP which is being started in foreground exists; and when the first APP in the starting stage does not exist in foreground, it may be determined that the first APP which is being started in foreground does not exist. Here, the condition that the first APP which is being started in foreground does not exist may include that: the starting of the APP running in foreground has been completed and the APP is in a foregrounding running stage; or may also include that: the APP which is being started in foreground does not exist and the APP running in foreground does not exist, either.

In step 103, if the first APP which is being started in foreground does not exist, the APP to be preloaded is preloaded.

In the embodiments of the disclosure, the first APP which is being started in foreground is determined to not exist, the APP to be preloaded is preloaded, thereby avoiding slowing down and non-fluency for starting of the foreground APP, and effectively increasing the preloading speed of the APP to be preloaded.

In the embodiments of the disclosure, when there is only one APP to be preloaded, an APP preloading sequence is not required to be considered; and when there are multiple APPs to be preloaded, the multiple APPs to be preloaded may be determined as APPs presently to be preloaded and may be preloaded one by one; more than two APPs to be preloaded may also be determined as APPs presently to be preloaded and may be preloaded simultaneously, that is, preloading processes for the multiple APPs may be concurrently implemented.

In the embodiments of the disclosure, a specific preloading process and a loaded resource are not limited. For example, a hardware resource may be allocated for an APP to be preloaded, and related data required by starting may be loaded based on the allocated hardware resource. Exemplarily, APP process starting, APP service starting, memory allocation, file content reading, network data acquisition, interface rendering and the like may be included. In addition, the preloaded resource may be determined according to a specific type of an APP to be preloaded. For example, if the APP to be preloaded is social software, then a starting picture, a contact list, recent message records and the like in the APP may be preloaded; and if the APP to be preloaded is a game, then data related to game background and the like in the APP may be preloaded.

Optionally, when the first APP which is being started in foreground is determined to exist, the preloading of the APP to be preloaded is forbidden. Such a setting has the advantages that the speed of starting the first APP may be effectively ensured, the slowing down or non-fluency for starting of the first APP may be avoided and the user experience may be effectively improved. Optionally, after the foreground starting of the first APP is completed, namely after the display interface of the first APP is completely displayed, the APP to be preloaded may be preloaded.

According to the APP preloading method provided in the embodiments of the disclosure, in response to detecting that an APP preloading event is triggered, an APP to be preloaded is determined, whether a first APP which is being started in foreground exists or not is judged, and if such a first APP does not exist, the APP to be preloaded is preloaded. With adoption of the technical solutions, not only the low speed and non-fluency, caused by preloading an APP, for starting of the APP in foreground may be effectively avoided, but also a speed of preloading the APP to be preloaded may be effectively increased, so that a speed of starting the APP to be preloaded may be increased.

In some embodiments, the APP preloading method may further include that: during a process of preloading the APP to be preloaded, in response to detecting that a starting event of a foreground APP is triggered, preloading the APP to be preloaded is terminated, and a preloaded starting resource corresponding to the APP to be preloaded is released. It is to be understood that the priority of starting an APP in foreground is higher than the priority of preloading the APP. That is, when the first APP which is being started in foreground exists, preloading the APP to be preloaded is forbidden, and similarly, if it is detected that the event of starting an APP in foreground is triggered during the process of preloading the APP to be preloaded, preloading the APP to be preloaded is terminated. Such a setting has the advantages that the low speed and non-fluency, caused by preloading an APP, for starting of the foreground APP may be effectively avoided and the speed of starting the APP in foreground may be increased.

Exemplarily, the operation that it is detected that the starting event of a foreground APP is triggered may include that: when a calling instruction of another APP for calling the foreground APP is detected, it is determined that triggering of the starting event of the foreground APP is detected; or when it is received that a user presses an desktop icon corresponding to the foreground APP, it is determined that triggering of the starting event of the foreground APP is detected. During the process of preloading an APP to be preloaded, if it is detected that the starting event of the foreground APP is triggered, preloading the APP to be preloaded is terminated, and the preloaded starting resource, particularly the system resource such as a CPU, a GPU, an I/O interface and the like used in the preloading process, corresponding to the APP to be preloaded is released. In such a manner, more system resources may be provided for the starting of the foreground APP, and the speed of starting the foreground APP may be effectively increased.

In some embodiments, the operation that the preloaded starting resource corresponding to the APP to be preloaded is released may include that an active window exclusive lock occupied by the APP to be preloaded is released. Such a setting has the advantage that the speed of starting the foreground APP may further be increased.

Figure 2:
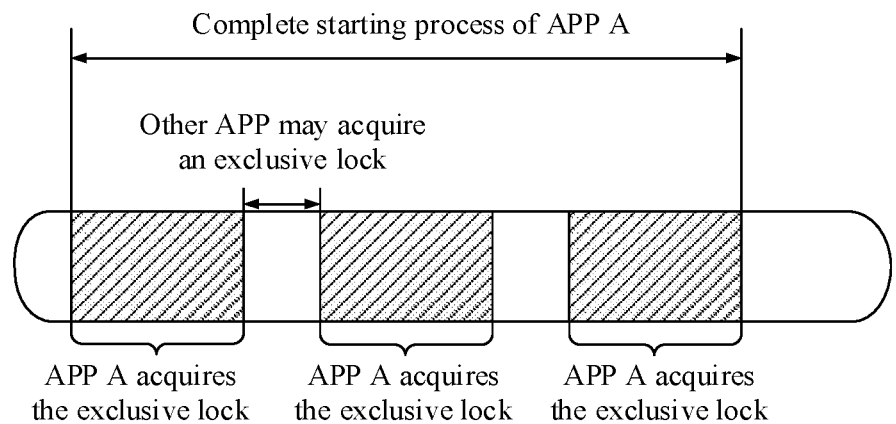
FIG. 2 is a schematic diagram of a process that only APP A calls an Activity exclusive lock in a starting stage according to an embodiment of the disclosure.
Figure 3:
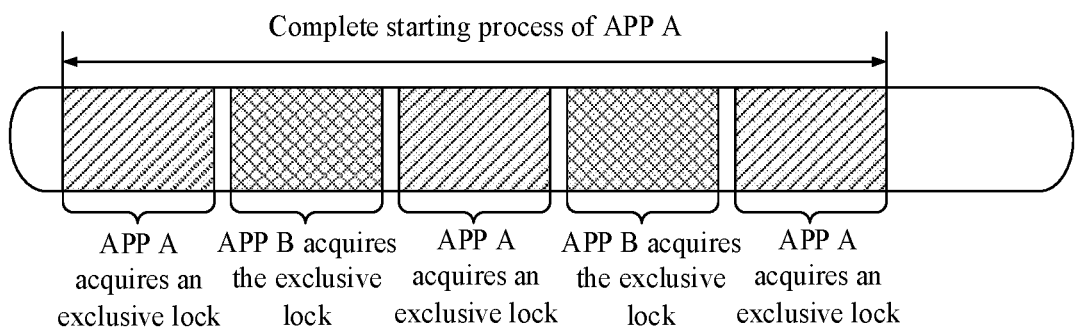
FIG. 3 is a schematic diagram of a process that APP A and APP B call an Activity exclusive lock when foreground starting of the APP A and preloading of the APP B which is to be preloaded are simultaneously executed according to an embodiment of the disclosure.

In the embodiments of the disclosure, when foreground starting of the APP and the preloading of the APP are simultaneously executed, there may exist contention for the resource including the CPU, the GPU, the I/O interface and the like as well as contention for the active window exclusive lock (which may be called an Activity exclusive lock for short). The contention for an Activity exclusive lock may bring non-fluency even worse. Here, the Activity exclusive lock is configured to ensure integrity of a data sharing operation, and at the same moment, only one APP may call the Activity exclusive lock. That is, in the whole starting process of a certain APP, many operations are required to be executed, for example, creation of a starting process, memory allocation, reading of file contents, interface rendering and the like, but not every starting operation requires acquisition of an Activity exclusive lock. For example, during creation of a starting process, an Activity exclusive lock is not required to be acquired. Therefore, in the whole process of starting a certain APP, the Activity exclusive lock is not always occupied, and the Activity exclusive lock is intermittently acquired. Exemplarily, FIG. 2 is a schematic diagram of a process that only APP A calls an Activity exclusive lock in a starting stage. The APP A acquires an Activity exclusive lock for three times in the starting stage. FIG. 3 is a schematic diagram of a process that APP A and APP B call an Activity exclusive lock when foreground starting of the APP A and preloading the APP B which is to be preloaded are simultaneously executed. From FIG. 2 and FIG. 3, it can be seen that, when foreground starting of the APP A and the preloading the APP B are simultaneously executed, there exists contention for the Activity exclusive lock, which may increase a duration of starting the APP A and cause slowing-down or non-fluency for foreground starting of the APP A. Based on such a consideration, during the process of preloading the APP to be preloaded, in response to detecting that the starting event of the foreground APP is triggered, preloading the APP to be preloaded is terminated, and the Activity exclusive lock occupied by the APP to be preloaded is released, to increase the speed of starting the APP in foreground.

Optionally, the foreground starting priority of an APP is higher than the preloading priority of the APP, but operations of the same priority are not mutually exclusive. That is, the foreground starting of multiple APPs may be simultaneously executed, and preloading multiple APPs to be preloaded may also be simultaneously executed.

In some embodiments, the operation that an APP to be preloaded is preloaded may include that an APP interface corresponding to the APP to be preloaded is preloaded based on a pre-created preloading active window stack. A boundary coordinate of the preloading active window stack is located outside a coordinate range of a display screen. Such a setting has the advantages that preloading the APP interface may complete preparations for APP starting to a relatively great extent and increase the starting speed of the APP to be preloaded without influencing display of a display content of the foreground APP on the display screen.

In the embodiments of the disclosure, an active window may be understood as an independent interface directly oriented for interaction and operations of a user, and the interface may be named after different names in different operating systems. For convenient understanding, descriptions will be made below with an Android operating system as an example.

In an Android system, an active window is called Activity. Activity is a component responsible for interaction with a user. Activity provides a screen (which may be understood as not a physical display screen but a screen interface) for interaction with a user to complete a task. In an Android APP, an activity is usually an independent screen where some controls may be displayed and an event of a user may be monitored and processed. During management over the activity, there are two concepts: task (task stack) and stack (Activity stack). A task corresponds to an APP. A task is configured to store an activity. One or more activities may be stored in a task and these activities follow a principle of "first in last out and last in first out". A stack is configured to manage a task. A stack usually manages tasks to which each activity required to be displayed on a screen belongs. A stack may manage one or more tasks. Similarly, the stack also follows a basic management principle of stacks. Here, the screen may not always be a complete and independent display screen. For example, for "two screens", the two screens may be two regions only where respective display contents are independently displayed in a complete display screen. If a terminal has two or more than two independent display screens, the "two screens" may be two independent display screens.

In the Android system, a multi-window mode is supported, which may include a split-screen mode, a picture-in-picture mode and a freeform mode. In the multi-window mode, a stack where an APP is located may have its own size and may include upper, lower, left and right coordinates in a coordinate system taking a left upper corner of a screen of a terminal as an origin. For example, (a, b, c, d) usually describes a boundary of a rectangle and may be represented with a coordinate at a left upper corner and a coordinate at a right lower corner of the rectangle, that is, the coordinate at the left upper corner of the rectangle is (a, b) and the coordinate at the right lower corner is (c, d), and such a rectangular region corresponds to a size of the stack. A layout in an APP in the stack depends on the size of the stack, that is, an APP interface corresponding to an Activity is displayed inside a boundary range of the size.

In the multi-window mode, multiple APPs may be allowed to be in a visible state, including visibility for both of a system and a user and visibility only for a system. Visibility for both of a system and a user refers to that an APP is displayed on a display screen and is visible for the user. Visibility only for a system refers to that an APP is visible for an operating system and invisible for a user and that the APP may be covered by a foreground APP or is displayed outside the display screen, as to be implemented in the disclosure.

In the embodiments of the disclosure, the operation that the APP interface of the APP to be preloaded is preloaded outside the display screen may be implemented based on a multi-window mechanism of the operating system. The size corresponding to the APP is set outside the display screen through the multi-window mechanism for invisibility for the user, so that influence on displaying of a display content of a foreground APP on the display screen may be eliminated.

Generally speaking, in the multi-window mode, there may exist various types of stacks. For example, a home stack represents a stack for displaying of a desktop APP, and an APP stack represents a displaying of a third-party application. There may be other split-screen stacks and the like. In the embodiments of the disclosure, the preloading Activity stack (i.e., a preloading stack) is newly added to represent a stack for displaying of a preloaded APP. The boundary coordinate of the preloading stack is set to be located outside the coordinate range of the display screen, and the APP to be preloaded may be displayed in the stack. For the Android system, a stack dedicated to displaying of a preloaded APP may be newly created based on the multi-window mechanism of the Android system. In the embodiments of the disclosure, the stack is newly created to endow the newly created preloading stack with its own size and visibility, thereby achieving a purpose of preloading outside a display screen.

In the embodiments of the disclosure, the timing for creating a preloading stack is not limited. The preloading stack may be set to be in a permanent state as a default before delivery of a terminal, that is, the preloading stack exists all the time. A preloading stack may also be created when the terminal is started or after the terminal is successfully unlocked. A preloading stack may also be created after an APP preloading event is triggered (before the APP to be preloaded is determined). Optionally, the operation that the APP interface corresponding to the APP to be preloaded is preloaded based on the pre-created preloading Activity stack may include that: whether the pre-created preloading Activity stack exists or not is judged; if the pre-created preloading Activity stack does not exist, the preloading Activity stack is created according to a preset rule; and the APP interface corresponding to the APP to be preloaded is preloaded based on the created preloading Activity stack. Such a setting has the advantage that whether the preloading stack exists or not is judged after the APP to be preloaded is determined; if the preloading stack exists, creation is not required, and otherwise, if the preloading stack does not exist, creation is performed, so that a system resource is saved. It is to be understood that, when there are multiple APPs to be preloaded, namely when multiple APPs are required to be continuously preloaded within a short time, if the preloading stack has been created before the first APP to be preloaded is started, the preloading stack exists before the second APP to be preloaded is started and no such judgment is required to be made.

In the embodiments of the disclosure, the specific process of preloading the APP interface corresponding to the APP to be preloaded based on the preloading stack is not limited. For example, the APP interface may be drawn and displayed based on the size of the preloading stack.

In some embodiments, the operation that the APP interface corresponding to the APP to be preloaded is preloaded based on the pre-created preloading Activity stack may include that: a target process corresponding to the APP to be preloaded is created; a task stack corresponding to the APP to be preloaded is created in the pre-created preloading Activity stack; an Activity corresponding to the APP to be preloaded is started in the task stack based on the target process; and the APP interface corresponding to the APP to be preloaded is drawn and displayed based on the started Activity. Such a setting has the advantages that the APP interface of the APP to be preloaded may be drawn and displayed based on the preloading Activity stack outside the coordinate range of a screen, so that interference to the running and displaying of the foreground APP is eliminated, system stability is ensured and, meanwhile, the speed of starting the APP to be preloaded is effectively increased. When the target process is created, an initialization process of the target process may also be included. In an execution process of the steps, preloading other resources may also be involved, for example, APP service starting, memory allocation, file content reading and network data acquisition. A process for preloading other resources is not limited in the embodiment of the APP.

In some embodiments, the method may further include that: a falsified focus notification is sent to the APP to be preloaded, and continuous drawing and displaying updating are kept performed on the APP interface corresponding to the APP to be preloaded in a preset time period based on the falsified focus notification. Such a setting has the advantages that the APP interface may be drawn and displayed under the condition that the APP to be preloaded obtains a focus and is visible for the system, so that a completion degree of preloading is improved without influence on a focus of the foreground APP. The focus in the embodiment of the disclosure is also called an input focus and a falsified focus is independent of the focus corresponding to the foreground APP. Generally speaking, for the present Android system, the focus is unique. For example, an input operation such as touch is valid only for the focus. For input focus information, the system is matched with the APP. Once the system modifies the input focus information, information about changing of the input focus information may be sent to the APP. In such a manner, matching of the input focus information of the system with that of the APP is ensured. In an embodiment of the disclosure, a focus can be falsified by an APP by separating the input focus information of the system from that of the APP. Specifically, in the embodiment of the disclosure, a focus notification is falsified for the preloaded APP to provide focus information for the preloaded APP, and the focus information of the system is kept correct. By such processing, the preloaded APP may be normally drawn to achieve complete loading. Existence of the focus in the system and the APP may be considered as existence in a server and a client, the system records an APP with the focus and the APP stores a flag identifying whether it has the focus or not. The timing for falsifying an input focus may be as follows: a falsified focus notification is generated and sent when a window system of Android has a newly added window and the focus is required to be updated. A focus falsification method may be a method for changing a window focus on a client side calling a window, which enables the window to acquire a focus. Specifically, the falsified focus notification may be sent based on a Binder mechanism. The Binder mechanism is a most common manner for inter-process communication of the Android system, which may adopt a c/s architecture, i.e., a client/server architecture.

In the embodiments of the disclosure, a preset time period may be designed according to a practical condition and, for example, may be a fixed duration after preloading is started, or may also be a time bucket from starting of preloading to completion of preloading. In some embodiments, a length of the preset time period may include a playing duration when an advertisement is started or an animation is started in the APP to be preloaded. In processes of starting some APPs, some advertisements or animations may usually be played, playing durations of the advertisements or the animations are usually 3 seconds to tens of seconds and, when the advertisements or the animations are played, it is impossible for a user to execute any operation and the user can only wait until they are completely played, as a result, precious time of the user is wasted. Such a setting in the embodiments of the disclosure has the advantages that a starting advertisement or a starting animation is played outside the screen before the APP to be preloaded is started and, when the APP to be preloaded is started, a home page of the APP or other interfaces operable for the user may directly be accessed, so that the APP to be preloaded can be operated earlier and waiting time is reduced.

In some embodiments, after the operation that the APP interface corresponding to the APP to be preloaded is preloaded based on the pre-created preloading Activity stack, the method may further include that: when an instruction for starting a target APP in the APP to be preloaded is received, an APP interface corresponding to the target APP in the preloading Activity stack is migrated to the display screen for displaying. Such a setting has the advantages that, when the target APP is actually required to be started, the APP interface is directly migrated to the display screen for displaying, so that the APP interface may be rapidly switched and the starting speed is increased.

In some embodiments, the operation that the APP interface corresponding to the target APP in the preloading Activity stack is migrated to the display screen for displaying may include that: a task stack corresponding to the target APP in the preloading Activity stack is migrated to the top of an APP Activity stack; and size information, configuration information and visibility of the task stack are updated to display the APP interface corresponding to the target APP in the display screen. Such a setting has the advantages that stability of an interface migration process may be ensured, and the problems including screen non-fluency, blank screen, low migration speed and the like in a recovery process are solved.

Figure 4:
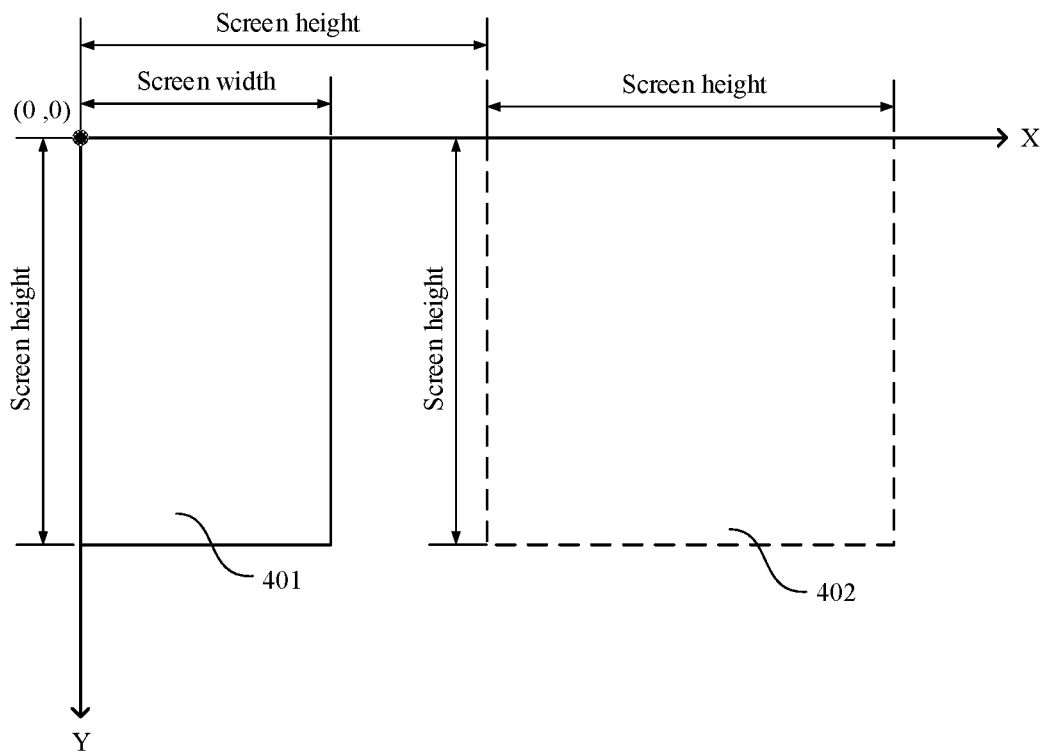
FIG. 4 is a schematic diagram of a relative position relationship between a preloading Activity stack and a display region of a display screen according to an embodiment of the disclosure.
Figure 5:
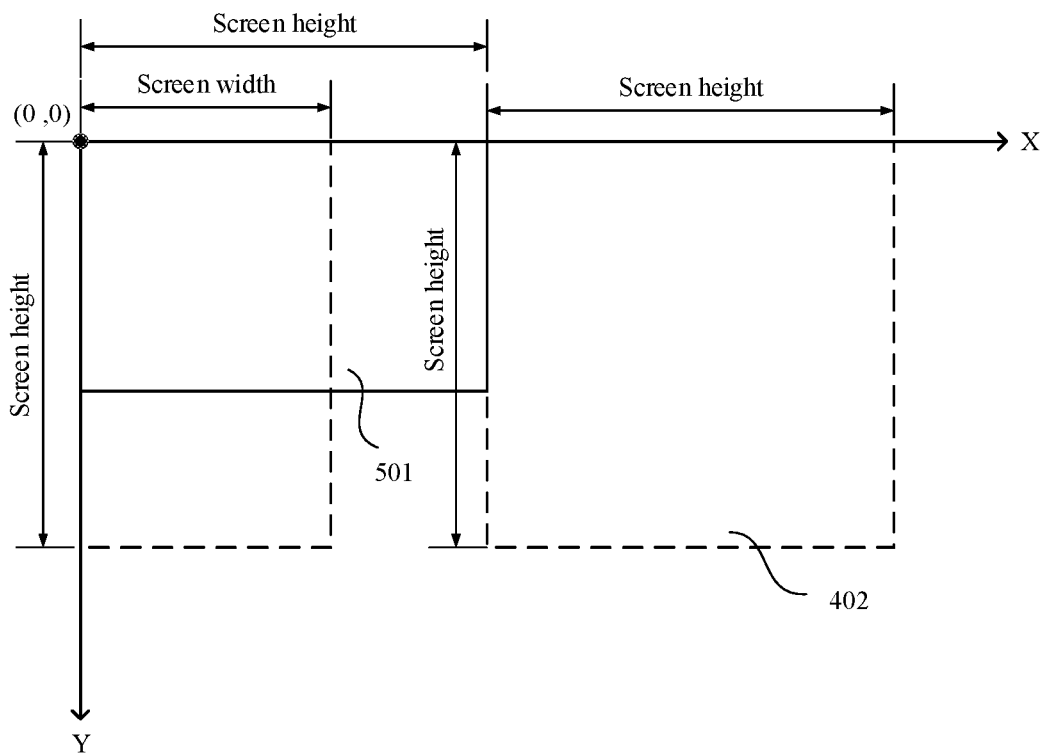
FIG. 5 is another schematic diagram of a relative position relationship between a preloading Activity stack and a display region of a display screen according to an embodiment of the disclosure.

For some terminals, particularly a mobile terminal such as a mobile phone and a tablet computer, a display manner for a display screen usually may include portrait displaying and landscape displaying for facilitating the use. Many APPs are displayed in a portrait manner as a default and some APPs (for example, some online games) are displayed in a landscape manner as a default. In the use of a terminal, some APPs may also be switched between portrait and landscape displaying manners according to a direction in which a user holds the terminal. In some embodiments of the disclosure, the boundary coordinate of the preloading Activity stack is (H, 0, 2H, H), a coordinate system corresponding to the boundary coordinate is a system coordinate, an origin of a system coordinate is a left upper corner of the display screen, and H is a length of a long side of the display region of the display screen. That is, the side corresponding to H is a longest side of the display region of the display screen, is a height of the display screen during portrait displaying and is a width of the display screen during landscape displaying. Such a setting is made to consider a landscape mode of the display screen, landscape displaying of the preloaded APP and normal displaying of some APPs. FIG. 4 is a schematic diagram of a relative position relationship between a preloading Activity stack and a display region of a display screen according to an embodiment of the disclosure. As shown in FIG. 4, the portrait manner is adopted for the display screen, the origin of the system coordinate of the terminal is a left vertex (0, 0) of the display screen 401, a width direction of the display screen 401 is an X axis, a height direction is a Y axis, the boundary coordinate of the preloading stack 402 is (H, 0, 2H, H) and H is the height of the screen, that is, a region within a left solid rectangular range is a main screen display region, and a region in a right dotted rectangular range is a preloading display region. FIG. 5 is another schematic diagram of a relative position relationship between a preloading Activity stack and a display region of a display screen according to an embodiment of the disclosure. As shown in FIG. 5, the landscape manner is adopted for the display screen, the origin of the system coordinate of the terminal is the left vertex (0, 0) of the display screen 501, the height direction of the display screen 501 is the X axis, the width direction is the Y axis, the boundary coordinate of the preloading stack 402 is (H, 0, 2H, H) and H is the height of the screen, that is, the region within the left solid rectangular range is the main screen display region and the region in the right dotted rectangular range is the preloading display region.

Reasons for setting each boundary of the preloading stack in such a manner are as follows.

A horizontal coordinate of the left upper corner is set to be H to prevent the interface of the preloaded APP from being displayed in the display screen (which may also be called a main screen) in a landscape mode, since both a portrait mode and the landscape mode may be adopted for the main screen. In the landscape mode of the main screen, for preventing part of the preloaded APP from being displayed in the main screen display region, the horizontal coordinate of the left upper corner of the rectangular region corresponding to the preloading stack is set to be the height of the screen.

A vertical coordinate of the left upper corner is set as 0 to correctly calculate a height of a status bar of the preloaded APP. For better designing a User Interface (UI) of an Android APP, a top status bar may be self-defined, and if the vertical coordinate of an upper side is not 0, the height of the status bar may be wrong.

A horizontal coordinate of the right lower corner is set to be 2H (twice the height of the screen), namely the width of the rectangle corresponding to the preloading stack=the height of the screen, so as to include a landscape APP (i.e., an APP of which an APP interface adopts a landscape displaying manner) during preloading within the size of the preloading stack.

A vertical coordinate of the right lower corner is set to be H, namely the height of the rectangle corresponding to the preloading stack=the height of the screen, so as to include a portrait APP during preloading within the size of the preloading stack.

Based on the above reasons, the size of the preloading stack is set to be (H, 0, 2H, H) herein.

Figure 6:
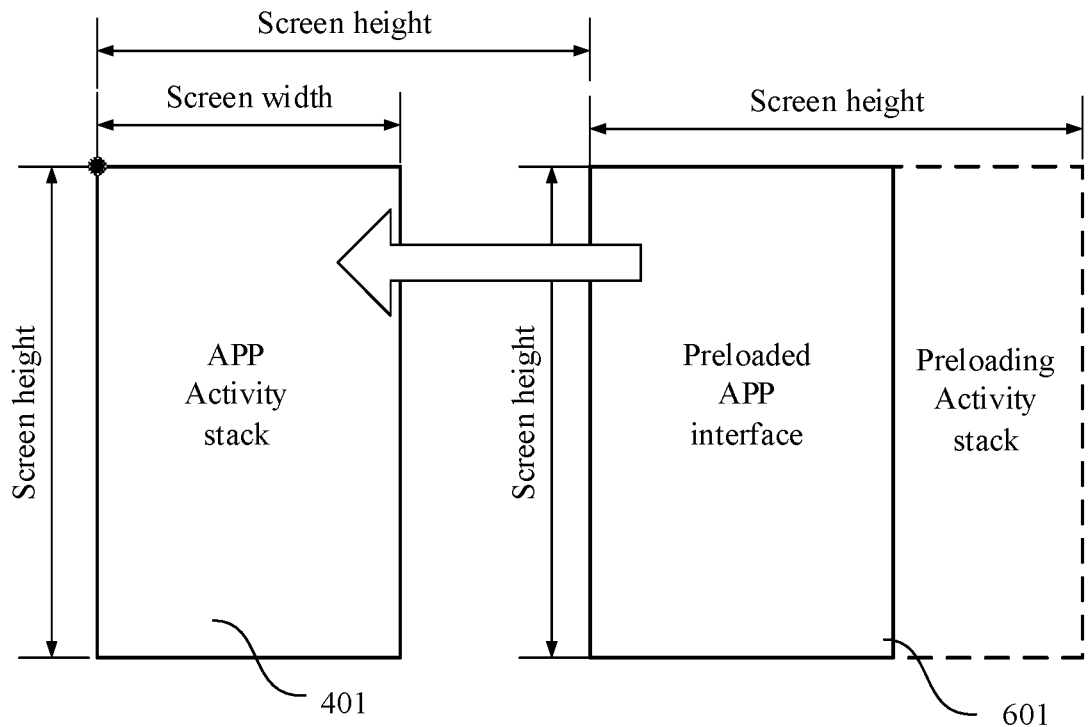
FIG. 6 is a schematic diagram of migration of an APP interface according to an embodiment of the disclosure.

In addition, FIG. 6 is a schematic diagram of migration of an APP interface according to an embodiment of the disclosure. As shown in FIG. 6, when an instruction for starting a target APP is received, the APP interface 601 corresponding to the target APP in the preloading Activity stack is migrated to the display screen 401 for displaying. Specifically, a task to which the preloaded APP interface belongs is migrated to the top of the APP Activity stack and the size information, configuration information and visibility of the stack are updated, so that the APP interface may be normally displayed on the display screen.

Figure 7:
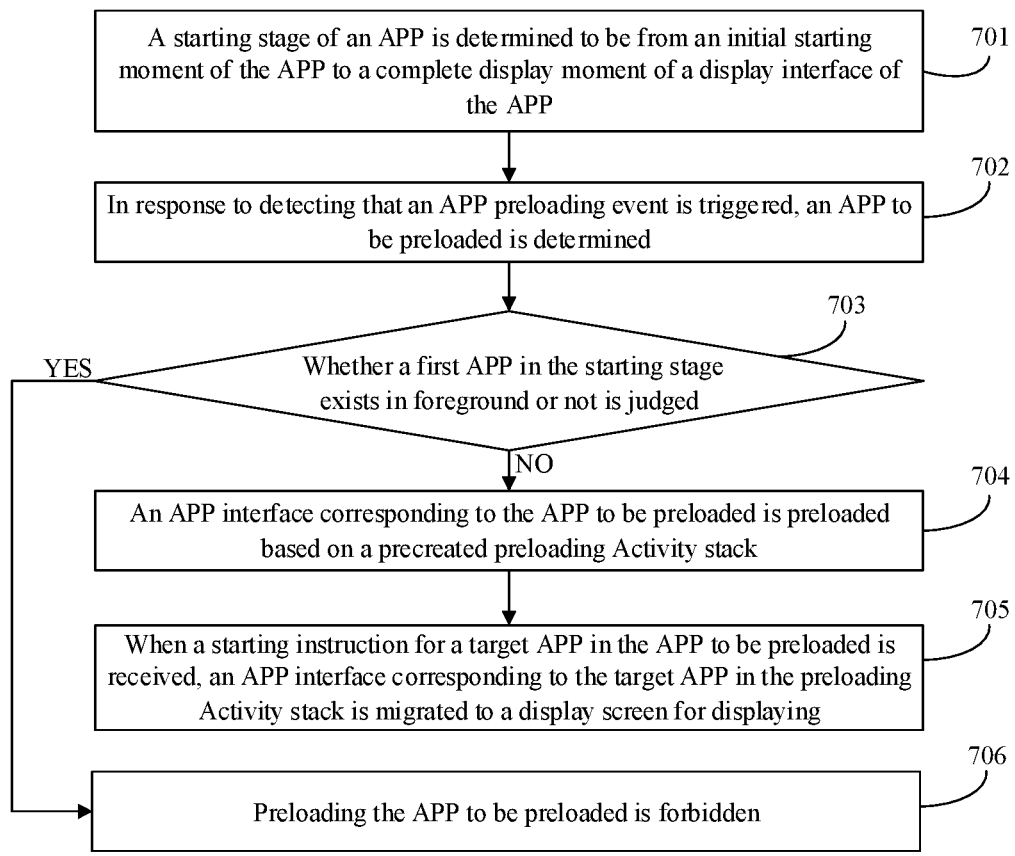
FIG. 7 is a flowchart of another APP preloading method according to an embodiment of the disclosure.

FIG. 7 is a flowchart of another APP preloading method according to an embodiment of the disclosure. The method includes the following steps.

In step 701, a starting stage of an APP is determined to be from an initial starting moment of the APP to a complete display moment of a display interface of the APP.

Exemplarily, if an initial starting moment of WeChat is 8:00 and a complete display moment of a display interface of WeChat is 8:01, a time period 8:00-8:01 is determined as a starting stage of WeChat.

In step 702, in response to detecting that an APP preloading event is triggered, an APP to be preloaded is determined.

In step 703, whether a first APP in the starting stage exists in foreground or not is judged, if the first APP in the starting stage exists, Step 706 is executed, otherwise Step 704 is executed.

In step 704, an APP interface corresponding to the APP to be preloaded is preloaded based on a pre-created preloading Activity stack.

Here, a boundary coordinate of the preloading Activity stack is located outside a coordinate range of a display screen.

In step 705, when an instruction for starting a target APP in the APP to be preloaded is received, an APP interface corresponding to the target APP in the preloading Activity stack is migrated to the display screen for displaying.

In step 706, preloading the APP to be preloaded is forbidden.

According to the APP preloading method provided in the embodiments of the disclosure, the starting stage of an APP is determined to be from the initial starting moment of the APP to the complete display moment of the display interface of the APP. When the first APP in the starting stage is determined to not exist in foreground, the APP interface corresponding to the APP to be preloaded is preloaded based on the pre-created preloading Activity stack, and when the instruction for starting the target APP in the APP to be preloaded is received, the APP interface corresponding to the target APP in the preloading Activity stack is migrated to the display screen for displaying. In such a manner, not only low speed and non-fluency, caused by preloading the APP, for starting of the foreground APP can be effectively avoided, but also a speed of preloading the APP to be preloaded may be effectively increased, so that a speed of starting the APP to be preloaded may be increased.

Figure 8:
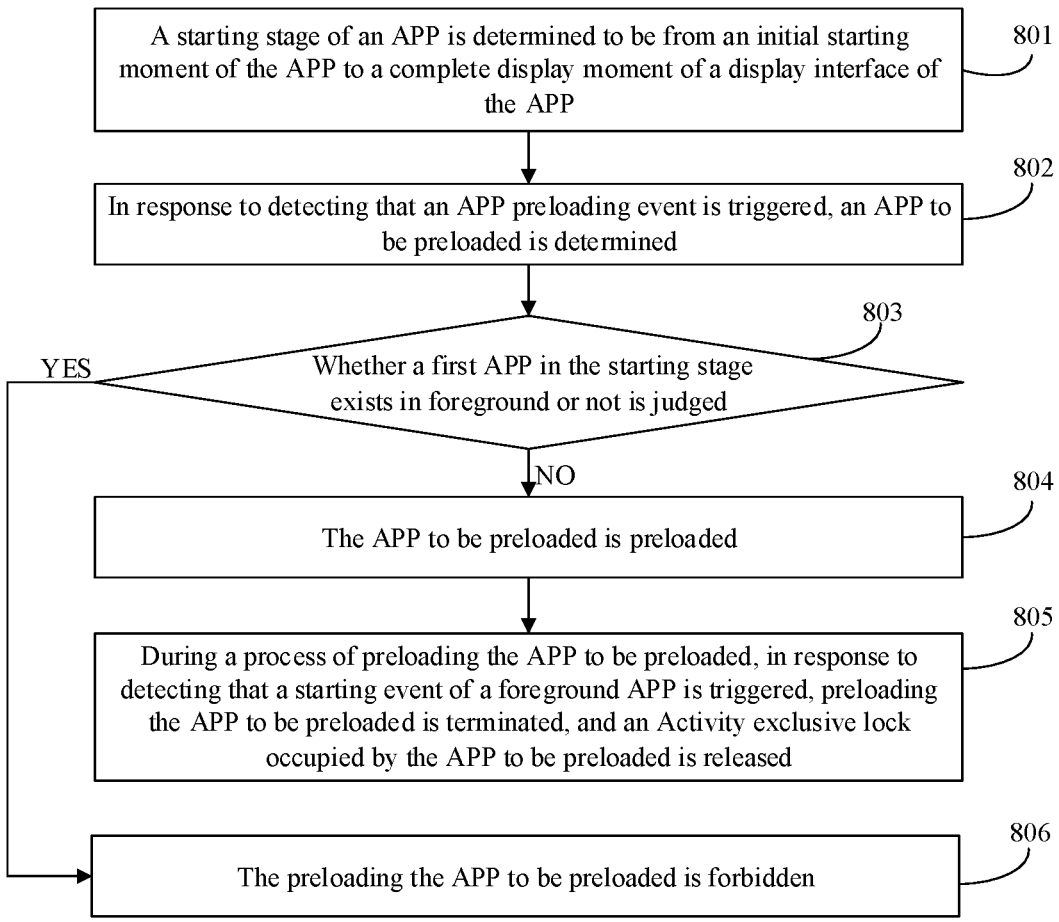
FIG. 8 is a flowchart of another APP preloading method according to an embodiment of the disclosure.

FIG. 8 is a flowchart of another APP preloading method according to an embodiment of the disclosure. The method includes the following steps.

In step 801, a starting stage of an APP is determined to be from an initial starting moment of the APP to a complete display moment of a display interface of the APP.

In step 802, in response to detecting that an APP preloading event is triggered, an APP to be preloaded is determined.

In step 803, whether a first APP in the starting stage exists in foreground or not is judged, if such a first APP exists, Step 806 is executed, otherwise Step 804 is executed.

In step 804, the APP to be preloaded is preloaded.

In step 805, during a process of preloading the APP to be preloaded, in response to detecting that a starting event of a foreground APP is triggered, preloading the APP to be preloaded is terminated, and an Activity exclusive lock occupied by the APP to be preloaded is released.

In step 806, preloading the APP to be preloaded is forbidden.

According to the APP preloading method provided in the embodiments of the disclosure, during the process of preloading an APP to be preloaded, in response to detecting that the starting event of a foreground APP is triggered, preloading the APP to be preloaded is terminated, and an Activity exclusive lock occupied by the APP to be preloaded is released, so that low speed and non-fluency, caused by preloading the APP, for starting of the foreground APP may be effectively avoided, and a speed of starting the foreground APP may further be increased.

Figure 9:
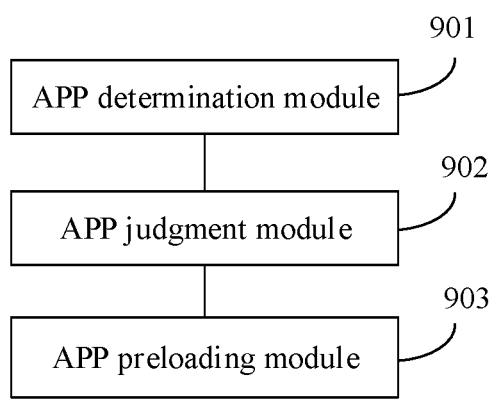
FIG. 9 is a structure diagram of an APP preloading device according to an embodiment of the disclosure.

FIG. 9 is a structure diagram of an APP preloading device according to an embodiment of the disclosure. The device may be implemented by software and/or hardware and is usually integrated in a terminal. An APP to be started may be preloaded by executing an APP preloading method. As shown in FIG. 9, the device includes an APP determination module 901, an APP judgment module 902 and an APP preloading module 903.

The APP determination module 901 is configured to, in response to detecting that an APP preloading event is triggered, determine an APP to be preloaded.

The APP judgment module 902 is configured to judge whether a first APP which is being started in foreground exists or not.

The APP preloading module 903 is configured to, if the first APP which is being started in foreground does not exist, preload the APP to be preloaded.

According to the APP preloading device provided in the embodiment of the disclosure, in response to detecting that an APP preloading event is triggered, an APP to be preloaded is determined, whether a first APP which is being started in foreground exists or not is judged, and if such a first APP does not exist, the APP to be preloaded is preloaded. With adoption of the technical solution, not only low speed and non-fluency, caused by preloading the APP, for starting of the APP in foreground may be effectively avoided, but also a speed of preloading the APP to be preloaded may be effectively increased, so that a speed of starting the APP to be preloaded may be increased.

Optionally, the device may further include a preloading forbidding module.

The preloading forbidding module may be configured to, when the first APP which is being started in foreground is determined to exist, forbid preloading the APP to be preloaded.

Optionally, a stage of starting an APP is determined to be from an initial starting moment of the APP to a complete display moment of a display interface of the APP.

The APP judgment module may be configured to judge whether the first APP in the starting stage exists in foreground or not.

Optionally, the device may further include a starting resource release module.

The starting resource release module may be configured to, during a process of preloading the APP to be preloaded, when a starting event of a foreground APP is detected to be triggered, terminate preloading the APP to be preloaded and release a preloaded starting resource corresponding to the APP to be preloaded.

Optionally, the operation that the preloaded starting resource corresponding to the APP to be preloaded is released may include the following operation.

An Activity exclusive lock occupied by the APP to be preloaded is released.

Optionally, the APP preloading module may be configured to preload an APP interface corresponding to the APP to be preloaded based on a pre-created preloading Activity stack, a boundary coordinate of the preloading Activity stack being located outside a coordinate range of a display screen.

Optionally, the device may further include an APP interface migration module.

The APP interface migration module may be configured to, after the APP interface corresponding to the APP to be preloaded is preloaded based on the pre-created preloading Activity stack, migrate an APP interface corresponding to the target APP in the preloading Activity stack to the display screen for displaying when an instruction for starting a target APP in the APP to be preloaded is received.

An embodiment of the disclosure also provides a storage medium including a computer-executable instruction, the computer-executable instruction being executable by a processor of a computer to execute an APP preloading method. The method includes the following steps.

When an APP preloading event is detected to be triggered, an APP to be preloaded is determined.

Whether a first APP which is being started in foreground exists or not is judged.

If such a first APP does not exist, the APP to be preloaded is preloaded.

The storage medium may be a memory device or storage device of any type. Term "storage medium" is intended to include: an installation medium, for example, a Compact Disk Read-Only Memory (CD-ROM), a floppy disk or a magnetic tape device; a computer system memory or a Random Access Memory (RAM), for example, a Dynamic RAM (DRAM), a Double Data Rate (DDR) RAM, a Static RAM (SRAM), an Extended Data Output (EDO) RAM (EDO RAM) and a Rambus RAM; a nonvolatile memory, for example, a flash memory and a magnetic medium (for example, a hard disk or an optical memory); and a register, a memory element of other similar type or the like. The storage medium may also include memories of other types or combinations thereof. In addition, the storage medium may be located in a first computer system where a program is executed or may be located in a different second computer system and the second computer system is connected to the first computer system through a network (for example, the Internet). The second computer system may provide a program instruction for a first computer to execute. Term "storage medium" may include two or more storage media capable of residing at different positions (for example, in different computer systems connected through the network). The storage medium may store a program instruction (for example, specifically implemented as a computer program) executable for one or more processors.

Of course, in the storage medium including the computer-executable instruction in the embodiment of the disclosure, the computer-executable instruction is not limited to execution of the abovementioned APP preloading operations but may also execute related operations in the APP preloading method provided in any embodiment of the disclosure.

Figure 10:
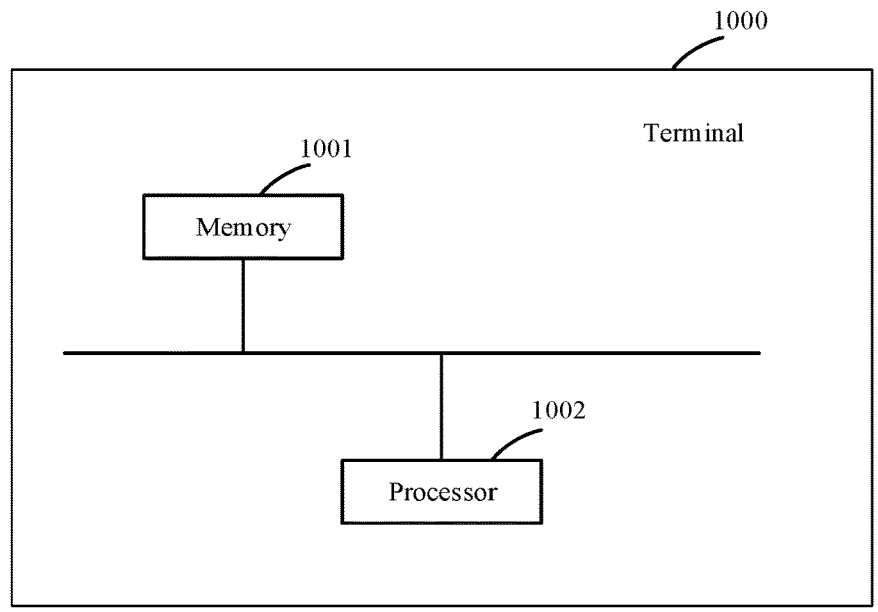
FIG. 10 is a structure diagram of a terminal according to an embodiment of the disclosure.

An embodiment of the disclosure provides a terminal. An APP preloading device provided in the embodiment of the disclosure may be integrated in the terminal. FIG. 10 is a structure diagram of a terminal according to an embodiment of the disclosure. The terminal 1000 may include a memory 1001, a processor 1002 and a computer program stored in the memory and capable of running on the processor. The processor 1002 may execute the computer program to implement the APP preloading method of the embodiments of the disclosure.

According to the terminal provided in the embodiment of the disclosure, when an APP preloading event is detected to be triggered, an APP to be preloaded is determined; whether a first APP which is being started in foreground exists or not is judged, and if such a first APP does not exist, the APP to be preloaded is preloaded. With adoption of the technical solution, not only low speed and non-fluency, caused by preloading the APP, for starting of the APP in foreground may be effectively avoided, but also a speed of preloading the APP to be preloaded may be effectively increased, so that a speed of starting the APP to be preloaded may be increased.

Figure 11:
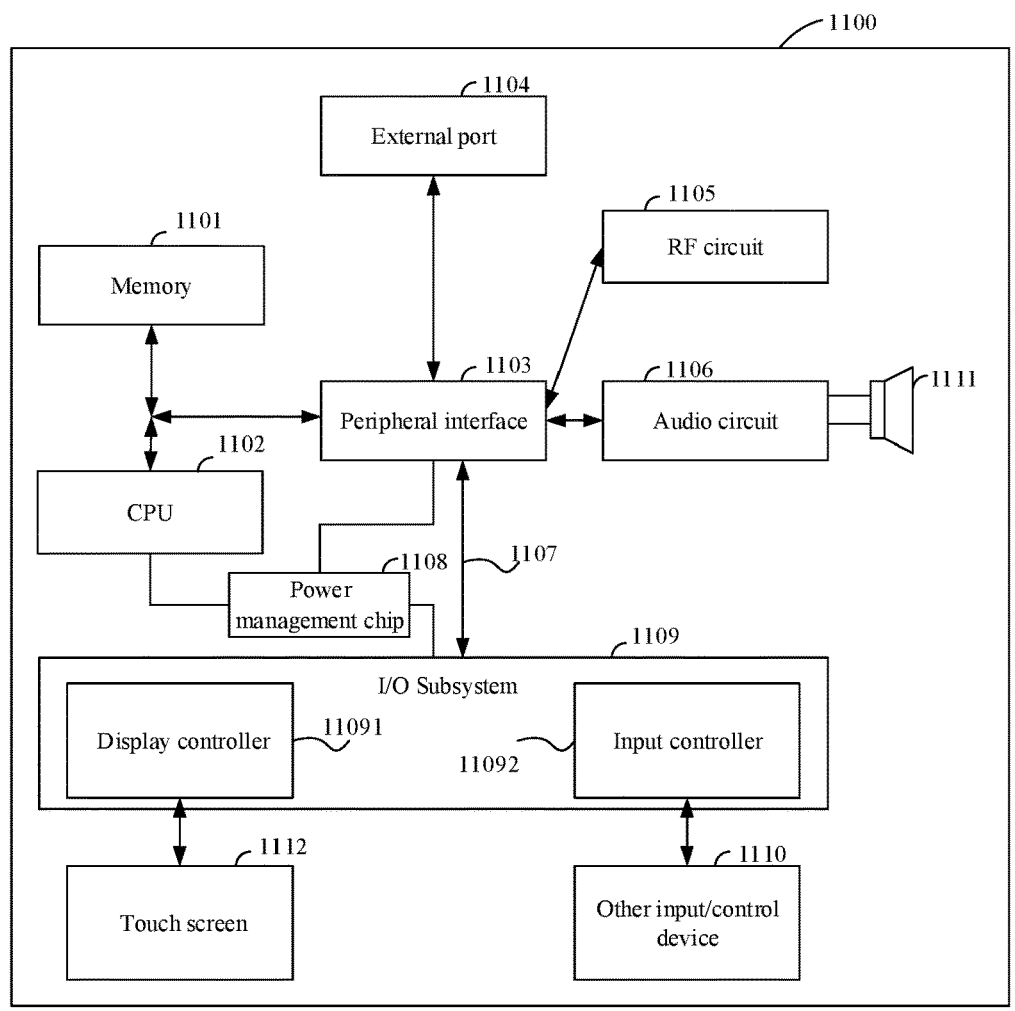
FIG. 11 is a structure diagram of another terminal according to an embodiment of the disclosure.

FIG. 11 is a structure diagram of another terminal according to an embodiment of the disclosure. The terminal may include a shell (not shown in the figure), a memory 1101, a CPU 1102 (also called a processor), a circuit board (not shown in the figure) and a power circuit (not shown in the figure). The circuit board is arranged in a space enclosed by the shell. The CPU 1102 and the memory 1101 are arranged on the circuit board. The power circuit is configured to supply power to each circuit or device of the terminal. The memory 1101 is configured to store an executable program code. The CPU 1102 reads the executable program code stored in the memory 1101 to run a computer program corresponding to the executable program code to implement the following steps.

In response to detecting that an APP preloading event is triggered, an APP to be preloaded is determined.

Whether a first APP which is being started in foreground exists or not is judged.

If such a first APP does not exist, the APP to be preloaded is preloaded.

The terminal may further include a peripheral interface 1103, a Radio Frequency (RF) circuit 1105, an audio circuit 1106, a speaker 1111, a power management chip 1108, an I/O subsystem 1109, other input/control device 1110, a touch screen 1112, other input/control device 1110 and an external port 1104. These parts communicate through one or more communication buses or signal lines 1107.

It is to be understood that the terminal 1100 in the figure is only an example of the terminal, the terminal 1100 may further be provided with parts more or fewer than those presented in the figure, and two or more parts may be combined or different part configurations may be adopted. Each part shown in the figure may be implemented in hardware including one or more signal processing and/or APP specific integrated circuits, software or a combination of the hardware and the software.

The APP preloading terminal provided in the embodiment will be described below in detail. For example, the terminal is a mobile phone.

The memory 1101: the memory 1101 may be accessed by the CPU 1102, the peripheral interface 1103 and the like. The memory 1101 may include a high-speed RAM and may further include a nonvolatile memory, for example, at least one disk storage device, flash memory device or other volatile solid-state storage device.

The peripheral interface 1103: the peripheral interface 1103 may connect an I/O peripheral of a device to the CPU 1102 and the memory 1101.

The I/O subsystem 1109: the I/O subsystem 1109 may connect the I/O peripheral, such as the touch screen 1112 and other input/control device 1110 on the device to the peripheral interface 1103. The I/O subsystem 1109 may include a display controller 11091 and one or more input controllers 11092 configured to control other input/control device 1110. The one or more input controllers 11092 receive an electrical signal from other input/control device 1110 or send an electrical signal to other input/control device 1110. Other input/control device 1110 may include a physical button (a pressing button, a rocker button and the like), a dial, a slide switch, an operating rod and a click wheel. It is to be noted that the input controller 11092 may be connected with any one of a keyboard, an infrared port, a Universal Serial Bus (USB) interface and an indication device such as a mouse.

The touch screen 1112: the touch screen 1112 is an input interface and output interface between a user terminal and a user and displays visual output to the user, and the visual output may include a graph, a text, an icon, a video and the like.

The display controller 11091 in the I/O subsystem 1109 may receive the electrical signal from the touch screen 1112 or send the electrical signal to the touch screen 1112. The touch screen 1112 may detect a touch on the touch screen. The display controller 11091 may convert the detected touch into interaction with a UI object displayed on the touch screen 1112 to implement human-computer interaction. The UI object displayed on the touch screen 1112 may be an icon of a running game, an icon connected to a corresponding network and the like. It is to be noted that the device may further include an optical mouse. The optical mouse may be a touch sensitive surface which does not display the visual output, or may be an extension of the touch sensitive surface formed by the touch screen.

The RF circuit 1105 may be mainly configured to establish communication with a wireless network (i.e., a network side) to implement data reception and sending, for example, reception and sending of short messages and electronic mails, between the phone and the wireless network. Specifically, the RF circuit 1105 may receive and send an RF signal. The RF signal may also be called an electromagnetic signal. The RF circuit 1105 may convert the electrical signal into the electromagnetic signal or convert the electromagnetic signal into the electrical signal and communicate with the communication network and other device through the electromagnetic signal. The RF circuit 1105 may include a known circuit configured to realize these functions and includes, but not limited to, an antenna system, an RF transceiver, one or more amplifiers, a tuner, one or more oscillators, a digital signal processor, a COder-DECoder (CODEC) chip set, a Subscriber Identity Module (SIM) and the like.

The audio circuit 1106 is mainly configured to receive audio data from the peripheral interface 1103, convert the audio data into an electrical signal and send the electrical signal to the speaker 1111.

The speaker 1111 is configured to recover a voice signal received from the wireless network by the phone through the RF circuit 1105 into a sound and play the sound to the user.

The power management chip 1108 is configured to supply and manage power for hardware connected with the CPU 1102, the I/O subsystem and the peripheral interface.

The APP preloading device, storage medium and terminal provided in the embodiments may execute the APP preloading method provided in any embodiment of the disclosure and have corresponding function modules executing the method and corresponding beneficial effects. Technical details not elaborated in the above embodiments may refer to the APP preloading method provided in any embodiment of the disclosure.

It is to be noted that the above is only the preferred embodiment of the disclosure and the adopted technical principle. Those skilled in the art should know that the application is not limited to the specific embodiments described herein. Those skilled in the art may make various apparent variations, regulations and replacements without departing from the scope of protection of the application. Therefore, although the application is described in relatively more detail with the above embodiments, the application is not limited to the embodiments and may further include more other equivalent embodiments without departing from the concept of the application. The scope of the application is determined by the scope of the appended claims.

The invention claimed is:

1. A method for Application (APP) preloading, comprising:
   determining, in response to detecting that an APP preloading event is triggered, an APP to be preloaded;
   judging whether a first APP which is being started in foreground exists or not; and
   in response to determining that the first APP which is not being started in foreground preloading, based on a preloading Activity stack which is pre-created in an Android system, an APP interface corresponding to the APP to be preloaded, a boundary coordinate of the preloading Activity stack being located outside a coordinate range of a display screen;
   migrating, in response to receiving an instruction for starting a target APP in the APP to be preloaded, an APP interface corresponding to the target APP in the preloading Activity stack to the display screen for displaying; and
   sending a falsified focus notification to the APP to be preloaded, and keeping performing continuous drawing and displaying updating on the APP interface corresponding to the APP to be preloaded in a preset time period based on the falsified focus notification, so that when the APP to be preloaded is started, a home page of the APP or other interfaces operable for the user is directly accessible.

2. The method of claim 1, further comprising:
   forbidding, in response to determining that the first APP which is being started in foreground exists, preloading the APP to be preloaded.

3. The method of claim 1, wherein judging whether the first APP which is being started in foreground exists or not comprises:
   judging whether the first APP in a starting stage exists in foreground or not, wherein the starting stage is from an initial starting moment of the first APP to a complete display moment of a display interface of the first APP.

4. The method of claim 1, further comprising:
   during a process of preloading the APP to be preloaded, terminating preloading the APP to be preloaded and releasing a preloaded starting resource corresponding to the APP to be preloaded, in response to detecting that a starting event of a foreground APP is triggered.

5. The method of claim 4, wherein releasing the preloaded starting resource corresponding to the APP to be preloaded comprises:
   releasing an active window exclusive lock occupied by the APP to be preloaded.

6. The method of claim 1, wherein
   the migrating the APP interface corresponding to the target APP in the preloading Activity stack to the display screen for displaying comprises:
   migrating a task stack corresponding to the target APP in the preloading Activity stack to a top of an APP Activity stack; and
   updating size information, configuration information and visibility of the task stack to display the APP interface corresponding to the target APP in the display screen.

7. A device for Application (APP) preloading, comprising:
   a memory for storing a computer program; and
   a processor, wherein the processor is configured to execute the computer program to implement steps of:
   determining, in response to detecting that an APP preloading event is triggered, an APP to be preloaded;
   judging whether a first APP which is being started in foreground exists or not; and
   in a case that the first APP which is not being started in foreground, preloading, based on a preloading Activity stack which is pre-created in an Android system, an APP interface corresponding to the APP to be preloaded, a boundary coordinate of the preloading Activity stack being located outside a coordinate range of a display screen;
   migrating, in response to receiving an instruction for starting a target APP in the APP to be preloaded, an APP interface corresponding to the target APP in the preloading Activity stack to the display screen for displaying; and
   sending a falsified focus notification to the APP to be preloaded, and keeping performing continuous drawing and displaying updating on the APP interface corresponding to the APP to be preloaded in a preset time period based on the falsified focus notification, so that when the APP to be preloaded is started, a home page of the APP or other interfaces operable for the user is directly accessible.

8. The device of claim 7, wherein the processor is further configured to execute the computer program to implement a step of:
forbidding, in response to determining that the first APP which is being started in foreground exists, preloading the APP to be preloaded.

9. The device of claim 7, wherein the processor is configured to execute the computer program to further implement a step of:
judging whether the first APP in the starting stage exists in foreground or not, wherein the starting stage is from an initial starting moment of the first APP to a complete display moment of a display interface of the first APP.

10. The device of claim 7, wherein the processor is further configured to execute the computer program to implement a step of:
during a process of preloading the APP to be preloaded, terminating, in response to detecting that a starting event of a foreground APP is triggered, the preloading the APP to be preloaded and releasing a preloaded starting resource corresponding to the APP to be preloaded.

11. The device of claim 10, wherein the processor is configured to execute the computer program to further implement a step of:
releasing an active window exclusive lock occupied by the APP to be preloaded.

12. The device of 8, wherein
the migrating the APP interface corresponding to the target APP in the preloading Activity stack to the display screen for displaying comprises:
migrating a task stack corresponding to the target APP in the preloading Activity stack to a top of an APP Activity stack; and
updating size information, configuration information and visibility of the task stack to display the APP interface corresponding to the target APP in the display screen.

13. A non-transitory computer-readable storage medium, in which a computer program is stored, wherein the computer program is executable by a processor to implement a method for Application (APP) preloading, the method comprising:
determining, in response to detecting that an APP preloading event is triggered, an APP to be preloaded;
judging whether a first APP which is being started in foreground exists or not; and
in response to determining that the first APP which is not being started in foreground, preloading, based on a preloading Activity stack which is pre-created in an Android system, an APP interface corresponding to the APP to be preloaded, a boundary coordinate of the preloading Activity stack being located outside a coordinate range of a display screen;
migrating, in response to receiving an instruction for starting a target APP in the APP to be preloaded, an APP interface corresponding to the target APP in the preloading Activity stack to the display screen for displaying; and
sending a falsified focus notification to the APP to be preloaded, and keeping performing continuous drawing and displaying updating on the APP interface corresponding to the APP to be preloaded in a preset time period based on the falsified focus notification, so that when the APP to be preloaded is started, a home page of the APP or other interfaces operable for the user is directly accessible.

14. A terminal, having the device for Application (APP) preloading of claim 7.

15. The terminal of claim 14, further comprising a circuit board, wherein the memory and the processor are arranged on the circuit board.

16. The terminal of claim 14, further comprising a power circuit for providing power to each circuit of the terminal.

17. The terminal of claim 14, further comprising at least one of:
a peripheral interface, a Radio Frequency (RF) circuit, an audio circuit, a speaker, a power management chip, an I/O subsystem, an input/control device, a touch screen, or an external port.

18. The terminal of claim 15, further comprising a shell, wherein the circuit board is arranged in a space enclosed by the shell.

* * * * *